United States Patent
Stirling et al.

(10) Patent No.: US 12,475,134 B2
(45) Date of Patent: Nov. 18, 2025

(54) TIME DISAMBIGUATION FOR NATURAL LANGUAGE QUERIES IN NETWORK MONITORING SYSTEMS

(71) Applicant: Cisco Technology, Inc., San Jose, CA (US)

(72) Inventors: Timothy Simon Stirling, Gilly (CH); Sofia Karygianni, Dübendorf (CH); Yannick Weibel, Cugy (CH); Mohit Dubey, Amsterdam (NL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/583,229

(22) Filed: Feb. 21, 2024

(65) Prior Publication Data

US 2025/0265261 A1    Aug. 21, 2025

(51) Int. Cl.
  *G06F 16/20* (2019.01)
  *G06F 16/21* (2019.01)
  *G06F 16/2452* (2019.01)
  *G06F 16/2458* (2019.01)
  *G06F 16/248* (2019.01)
  *G06F 40/58* (2020.01)

(52) U.S. Cl.
  CPC ........ *G06F 16/2477* (2019.01); *G06F 16/212* (2019.01); *G06F 16/2452* (2019.01); *G06F 16/248* (2019.01); *G06F 40/58* (2020.01)

(58) Field of Classification Search
  None
  See application file for complete search history.

(56) References Cited

U.S. PATENT DOCUMENTS

| | | | |
|---|---|---|---|
| 10,706,127 B2 * | 7/2020 | Amel | G06F 21/566 |
| 2010/0114856 A1 * | 5/2010 | Kuboyama | G06F 16/58 |
| | | | 707/E17.015 |
| 2017/0213157 A1 | 7/2017 | Bugay et al. | |
| 2018/0329993 A1 * | 11/2018 | Bedadala | G06F 16/90332 |
| 2020/0183930 A1 | 6/2020 | Das et al. | |
| 2021/0319048 A1 | 10/2021 | Aravamudan et al. | |
| 2022/0382857 A1 | 12/2022 | Liu et al. | |
| 2023/0133829 A1 * | 5/2023 | Kumar | G16H 20/10 |
| | | | 705/2 |
| 2023/0281194 A1 | 9/2023 | Lezcano et al. | |
| 2024/0296177 A1 * | 9/2024 | Gardner | G06N 5/041 |
| 2024/0419706 A1 * | 12/2024 | Gutierrez | G06F 16/335 |
| 2025/0045136 A1 * | 2/2025 | Mangal | G06F 11/3409 |

OTHER PUBLICATIONS

Quamar A., et al., "Natural Language Interfaces to Data", Foundations and Trends in Databases, vol. 11, No. 4, Dec. 26, 2022, pp. 1-96.
Wikipedia: "Time Series Database", retrieved on Feb. 12, 2024, 4 Pages.

* cited by examiner

*Primary Examiner* — Jau Shya Meng
(74) *Attorney, Agent, or Firm* — Merchant & Gould P.C.; Kenneth J. Heywood

(57) ABSTRACT

A device may obtain a query from a user interface regarding a computer network. The device may retrieve, based on the query, schema metadata from a database. The device may resolve any time ambiguity in the query using the schema metadata. The device may provide an answer to the query to the user interface, after resolving any time ambiguity in the query using the schema metadata.

20 Claims, 6 Drawing Sheets

… (1)

TIME DISAMBIGUATION FOR NATURAL LANGUAGE QUERIES IN NETWORK MONITORING SYSTEMS

TECHNICAL FIELD

The present disclosure relates generally to computer networks, and, more particularly, to time disambiguation for natural language queries in network monitoring systems.

BACKGROUND

Computer networks are large-scale distributed systems governed by complex dynamics and a very large number of parameters, both of which continue to increase as technology advances. Accordingly, the types and amount of network telemetry that a network monitoring system collects and consumes also continue to increase, year after year. In many cases, such network telemetry is stored as time series, allowing for the application of network assurance techniques to detect changes in the network over time and conditions that indicate degraded performance.

The recent breakthroughs in large language models (LLMs), such as ChatGPT and GPT-4, have increased interest in chat-based interfaces. In general, these types of interfaces allow users to issue unstructured, conversational/natural language queries, to garner information from a system. However, the nature of such queries can also lead to ambiguities which can lead to the system returning irrelevant or even incorrect answers. For instance, in the case of the query relating to network telemetry stored as time series data, there may be some ambiguities in the query around the time window to consider, the type of aggregation to perform on the data, or the like.

DESCRIPTION OF EXAMPLE EMBODIMENTS

Overview

According to one or more embodiments of the disclosure, a device obtains a query from a user interface regarding a computer network. The device retrieves, based on the query, schema metadata from a database. The device resolves any time ambiguity in the query using the schema metadata. The device provides an answer to the query to the user interface, after resolving any time ambiguity in the query using the schema metadata.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1A:
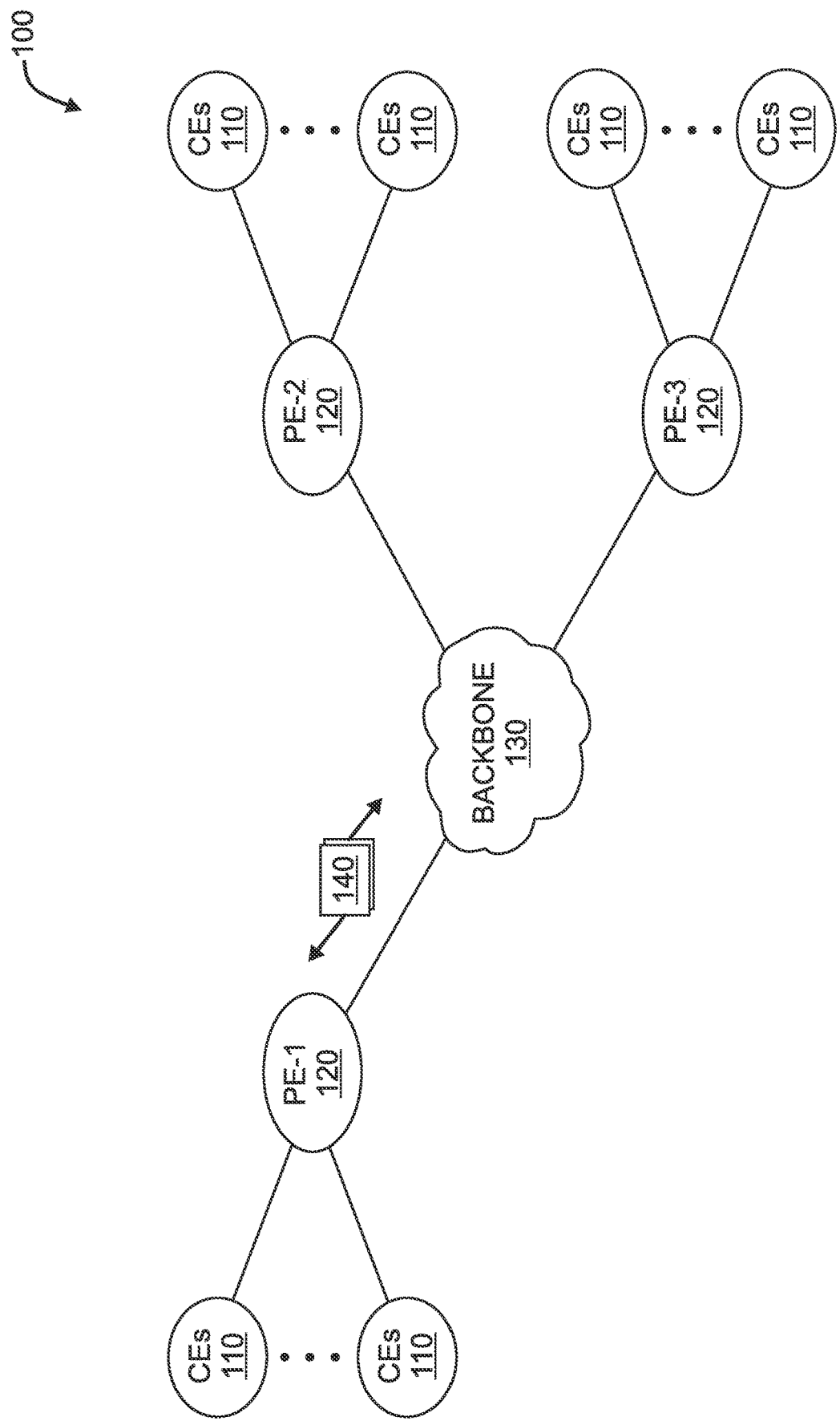
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
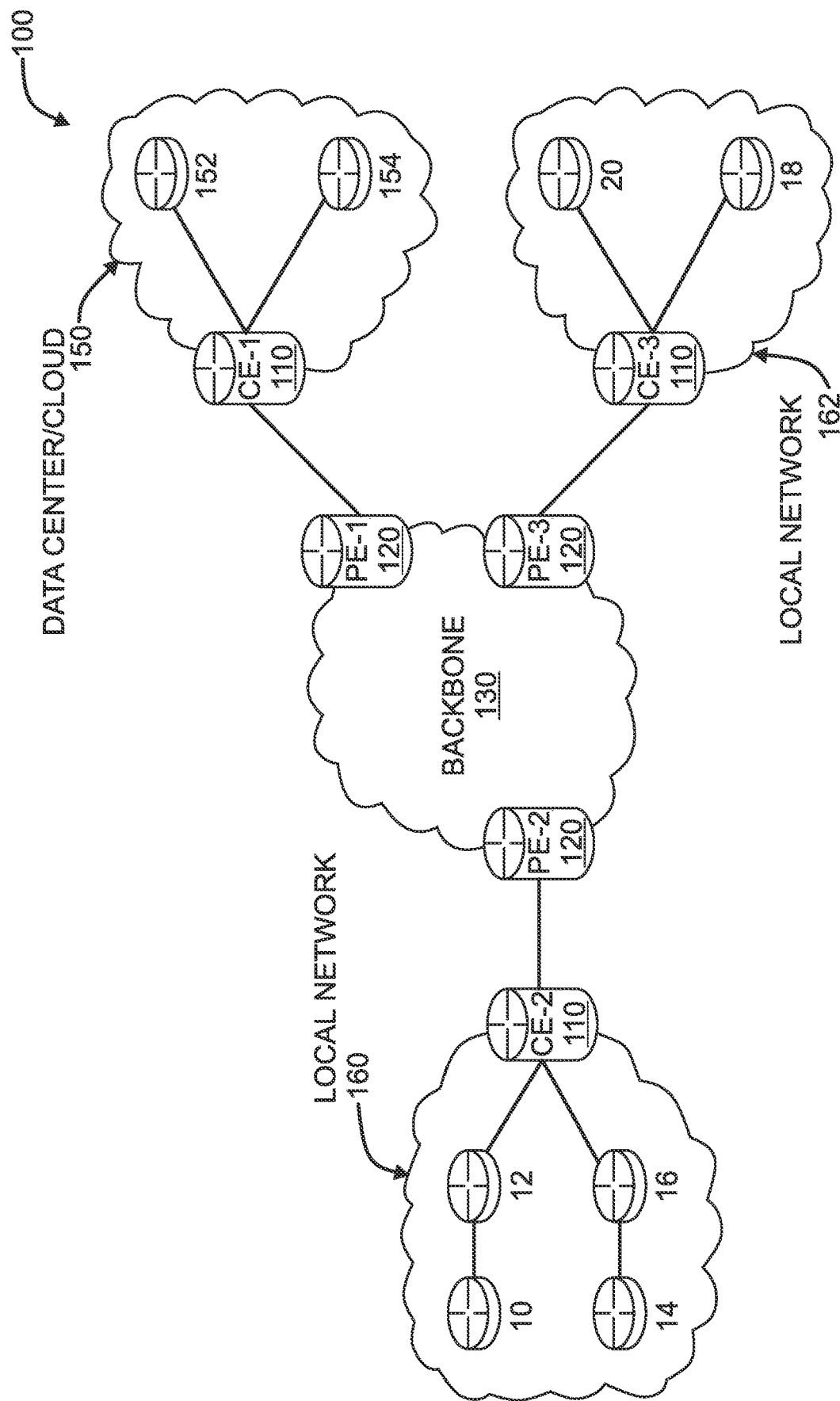

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, an authentication, authorization, and accounting (AAA) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, Internet of Things (IoT) networks, etc.

Figure 2:
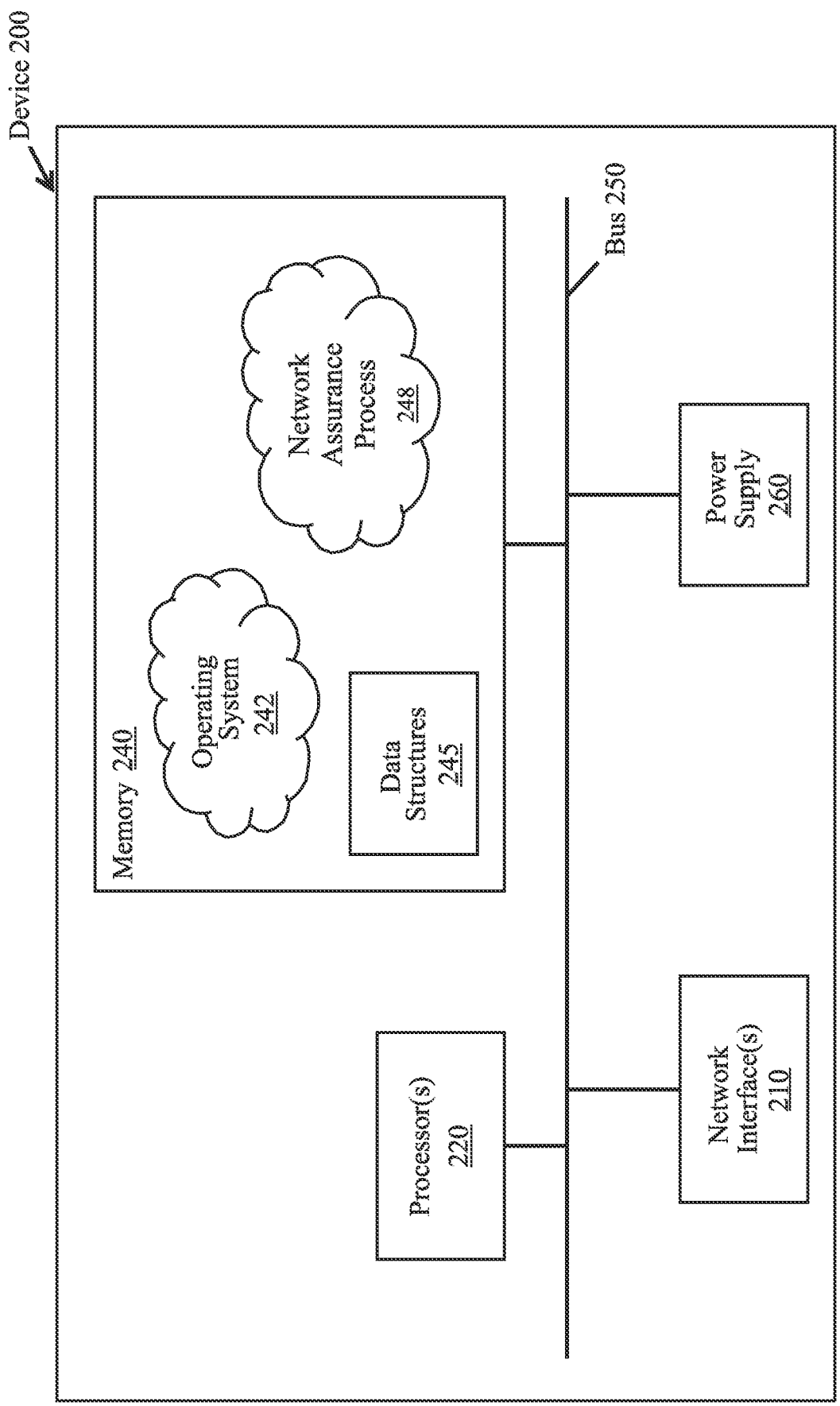
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In various embodiments, network assurance process 248 may utilize machine learning techniques, to enforce policies and/or to monitor the health of the network. In general, machine learning is concerned with the design and the development of techniques that take as input empirical data (such as network statistics and performance indicators), and recognize complex patterns in these data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) ANNs (e.g., for non-linear models), replicating reservoir networks (e.g., for non-linear models, typically for time series), random forest classification, or the like.

In further implementations, network assurance process 248 may also include one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of network assurance, network assurance process 248 may use a generative model to generate synthetic network traffic based on existing user traffic to test how the network reacts. Example generative approaches can include, but are not limited to, generative adversarial networks (GANs), large language models (LLMs), other transformer models, and the like.

Figure 3:
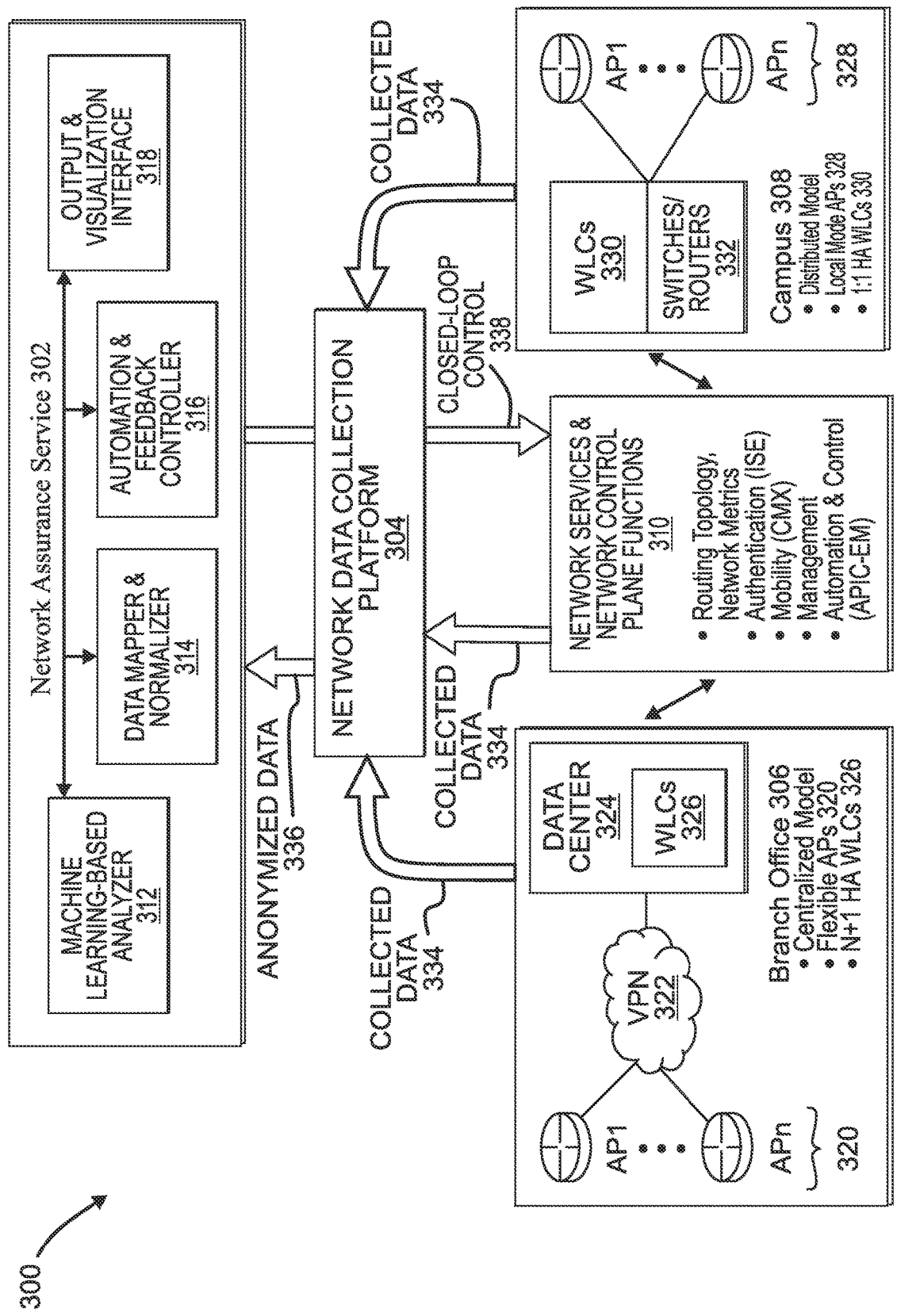
FIG. 3 illustrates an example network assurance system.

FIG. 3 illustrates an example network assurance system 300, according to various embodiments. As shown, at the core of network assurance system 300 may be a network assurance service 302 (e.g., a specifically configured device, such as device 200) that leverages machine learning in support of cognitive analytics for the network, predictive analytics (e.g., models used to predict user experience, etc.), troubleshooting with root cause analysis, and/or trending analysis for capacity planning. Generally, network assurance system 300 may support both wireless and wired network, as well as LLNs/IoT networks. Typically, network assurance service 302 may be located in the cloud. However, other embodiments provider for network assurance service 302 to be implemented in a data center or in the network undergoing monitoring.

In various embodiments, network assurance service 302 may oversee the operations of the network of an entity (e.g., a company, school, etc.) that includes any number of local networks. For example, network assurance service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both network assurance service 302 and the monitored network of the entity.

The network of branch office 306 may include any number of wireless access points 320 (e.g., a first access point AP1 through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point AP1 through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310, which it may store as various time series (e.g., in one or more databases). Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by network assurance service 302. In some cases, network data collection platform may also anonymize collected data 334 before providing the anonymized data 336 to network assurance service 302.

In some cases, network assurance service 302 may include a data mapper and normalizer 314 that receives the collected and/or anonymized data 336 from network data collection platform 304. In turn, data mapper and normalizer 314 may map and normalize the received data into a unified data model for further processing by network assurance service 302. For example, data mapper and normalizer 314 may extract certain data features from data 336 for input and analysis by network assurance service 302.

In various embodiments, network assurance service 302 may include a machine learning (ML)-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing network assurance service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to access points 320, 328, "ping-pong" clients, the number of visited access points 320, 328, roaming triggers, etc.). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should analyzer 312 predict abnormal network joining times, network assurance service 302 will be able to identify the major root cause of this predicted condition, thus allowing network assurance service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, network assurance service 302 may use the predicted user experiences from analyzer 312 to provide information to a network administrator or architect in real-time and enable closed loop control over the network via network assurance service 302, accordingly. For example, network assurance service 302 may signal to a particular type of endpoint node in branch office 306 or campus 308 (e.g., an iPhone, an IoT healthcare device, etc.) that better QoS will be achieved if the device switches to a different one of access points 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Network assurance service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Network assurance service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, network assurance service 302 may further include an automation and feedback controller 316 that provides closed-loop control instructions 338 back to the various devices in the monitored network. For example, based on the predictions by analyzer 312, the evaluation of any predefined health status rules by network assurance service 302, and/or input from an administrator or other user via input interface 318, controller 316 may instruct an endpoint client device, networking device in branch office 306 or campus 308, or a network service or control plane function 310, to adjust its operations (e.g., by signaling an endpoint to use a particular one of access points 320 or 328, etc.).

As noted above, the recent breakthroughs in large language models (LLMs), such as ChatGPT and GPT-4, have increased interest in chat-based interfaces. In general, these types of interfaces allow users to issue unstructured, conversational/natural language queries, to garner information from a system. However, the nature of such queries can also lead to ambiguities which can lead to the system returning irrelevant or even incorrect answers. For instance, in the case of issuing a query to network assurance service 302 or another such network monitoring system, there may be some ambiguities in the query around the time window to consider, the aggregation to perform on the data, or the like.

By way of example, consider the case in which a user issues a query to network assurance service 302 (e.g., via interface 318) such as the following: "What are the access points with the most clients?" Such a simple question also has several ambiguities:

What is the desired time window for the answer: is it today, in the last hour, in the last week, etc.?

What aggregation should be used for the multiple samples per access point in that time window: average number of clients per AP, maximum number of clients per AP, median number of clients per AP, etc.?

Time Disambiguation for Natural Language Queries in Network Monitoring Systems

The techniques herein allow for the removal of any ambiguities present in natural language queries issued to a network monitoring system, such as time ambiguities and the like. In some aspects, the techniques herein may use database schema information associated with any time series related to the query, to resolve any ambiguities in the query. In turn, the system may generate an answer and return that answer to the user for review.

Specifically, according to one or more embodiments of the disclosure as described in detail below, a device obtains a query from a user interface regarding a computer network. The device retrieves, based on the query, schema metadata from a database. The device resolves any time ambiguity in the query using the schema metadata. The device provides an answer to the query to the user interface, after resolving any time ambiguity in the query using the schema metadata.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Figure 4:
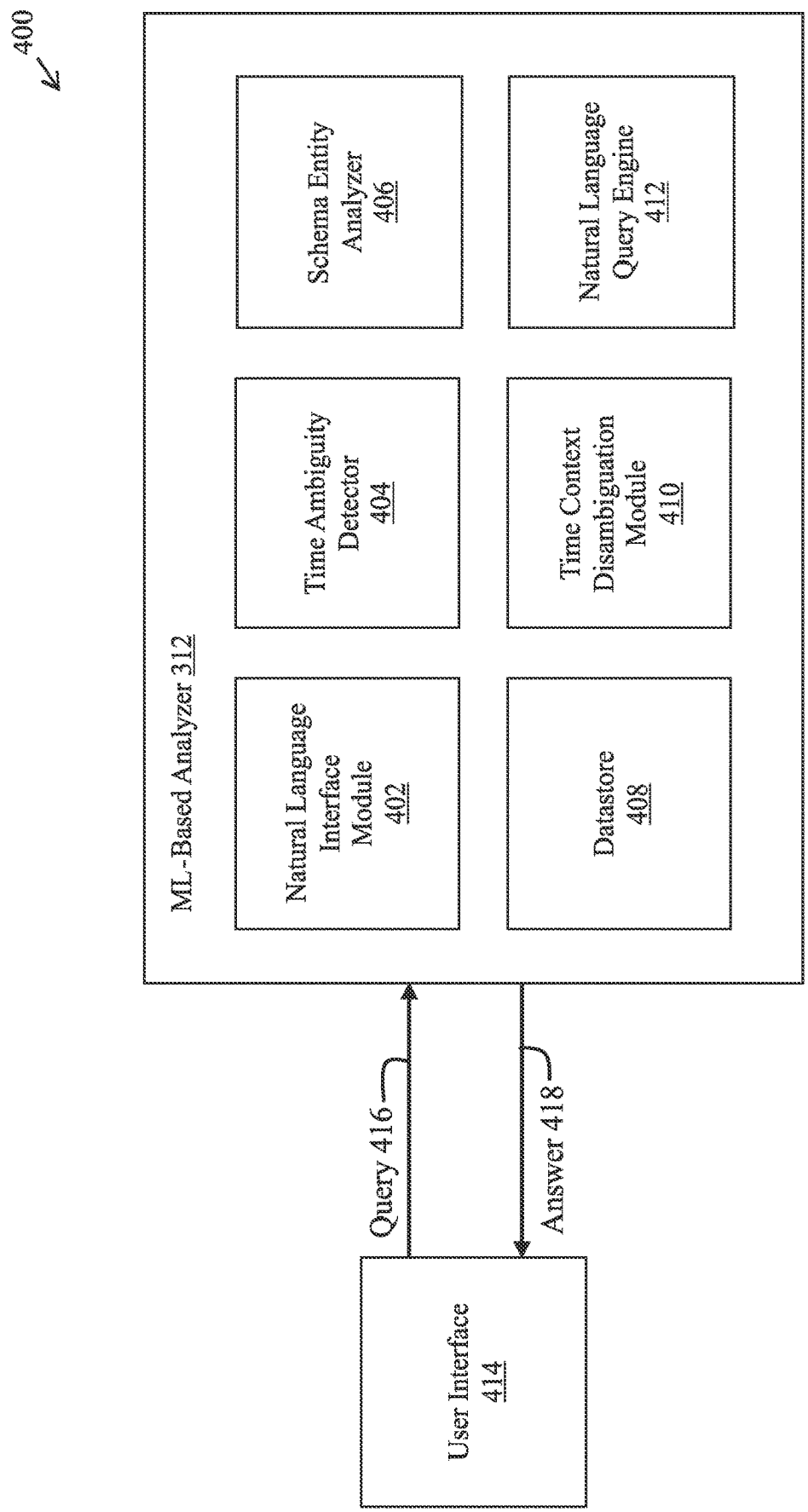
FIG. 4 illustrates an example architecture for time disambiguation for natural language queries in network monitoring systems.

Operationally, FIG. 4 illustrates an example architecture 400 for time disambiguation for natural language queries in network monitoring systems, according to various embodiments. At the core of architecture 400 may be the following components: a natural language interface module 402, a time ambiguity detector 404, a schema entity analyzer 406, a datastore 408, a time context disambiguation module 410, and/or a natural language query engine 412. In some implementations, the components 406-412 of architecture 400 may be implemented within a network assurance system, such as network assurance system 300 shown in FIG. 3, or as part of another form of network monitoring system. Accordingly, the components 406-412 of architecture 400 shown may be implemented as part of network assurance service 302 (e.g., as part of machine learning-based analyzer 312, as shown), as part of network data collection platform 304, and/or on one or more network elements/entities that communicate with one or more client devices within the monitored network itself. Further, these components 406-412 may be implemented in a distributed manner or implemented as its own stand-alone service, either as part of the local network under observation or as a remote service. In addition, the functionalities of the components of architecture 400 may be combined, omitted, or implemented as part of other processes, as desired.

In various implementations, assume that a user issues a query 416 to natural language interface module 402 via a user interface 414 (e.g., an endpoint device) regarding the computer network. In some instances, query 416 may take the form of unstructured, natural language. As would be appreciated, the term "query" is used in the broadest sense herein and can also include statements or commands requesting information from network assurance system 300 about a particular computer network. For instance, query 416 may include the text "Tell me the access points with the most clients," instead of asking for that information in the form of a question.

In various implementations, time ambiguity detector 404 may be responsible for detecting time-related ambiguities in query 416 issued by the user. In general, time ambiguity detector 404 may seek to do so by determining whether query 416 is correctly time bound or not. Incorrect time bounds could mean that time is completely unspecified, or it is determined in a way that would result in inefficient query execution. To achieve this, time ambiguity detector 404 may rely on knowledge of what tables need to be queried and what time bounds are acceptable per table, in order to provide an answer to query 416. Accordingly, time ambiguity detector 404 may interact with schema entity analyzer 406, which supplies this information to time ambiguity detector 404.

In general, schema entity analyzer 406 is responsible for knowing intricate information about the database schema in which the underlying time series data is stored, such as datastore 408. Example schema metadata that schema entity analyzer 406 may determine can include, but are not limited to, the expected number of records per time unit and per table, the maximum time window per table, the options for implicitly accumulating samples in the same time window, and the like. Based on query 416, time ambiguity detector 404 may request this information from schema entity analyzer 406 and use it to decide whether there are time ambiguities in the user question.

In one embodiment, schema entity analyzer 406 could be a statistical or machine learning model that infers this information based on entity specific heuristics like size, volume of data, etc. This information could come directly from database table statistics or by executing the analysis of queries against requested tables. For instance, in the case of query 416 asking for the access point with the most attached clients, schema entity analyzer 406 may identify the table(s) in datastore 408 that store access point telemetry data and determine the schema metadata associated with those one or more tables.

Based on the schema metadata from schema entity analyzer 406, time ambiguity detector 404 may then determine whether query 416 includes any time ambiguity. For instance, if the schema metadata from schema entity analyzer 406 indicates that datastore 408 stores counts of the number of clients attached to each access point at five-minute intervals, query 416 lacking any temporal constraints may lead time ambiguity detector 404 to determine that it has some time ambiguity. Conversely, if schema entity analyzer 406 indicates that datastore 408 only stores singular values of daily totals of the number of clients attached to the different access points in the network, then there may not be a time ambiguity and query 416 can be answered.

In cases in which time ambiguity detector 404 determines that query 416 includes time ambiguities, it may call time context disambiguation module 410, which is responsible for resolving any such ambiguities. In one embodiment, time context disambiguation module 410 may take the form of a large language model (LLM) that corrects the input question of the user by modifying the times constraints or adding appropriate ones. If missing, the LLM may also incorporate instructions that show how the time samples in the specified time window should be treated. The LLM could also communicate with schema entity analyzer 406 to get the preferred time windows or suggested aggregations per table.

In another embodiment, time context disambiguation module 410 may present the user via user interface 414 with the different options for time disambiguation and let the user choose via user interface 414. For instance, time context disambiguation module 410 may simply ask the user of user interface 414 to select between the last hour, last day, or last week, if query 416 includes any time ambiguities.

In various implementations, natural language query engine 412 is responsible for translating the possibly modified natural language query 416 into a query command that can be executed against datastore 408. In some instances, the query command may take the form of a SQL statement, API call, or the like, that will answer query 416. In one embodiment, natural language query engine 412 could also leverage an LLM to generate an answer 418. For instance, such an LLM could be fine-tuned for this task on the database or API schema.

Finally, natural language interface module 402 may be responsible for interacting with the user via user interface 414 to obtain the original query 416, showing the resolutions/decisions made from time context disambiguation module 410 to the user, allowing them to update/alter them and asking for extra input/decisions, if necessary, providing answer 418 to the user, and the like.

In one embodiment, natural language interface module 402 may also be able to collect feedback from the user ranking the different decisions made from time context disambiguation module 410 for resolving the time ambiguities. This feedback could be then used for further training of time context disambiguation module 410 to learn the implicit user preferences of the user and adjust to them (e.g., to obtain context regarding the user that issued query 416), such as by using reinforcement learning.

Figure 5:
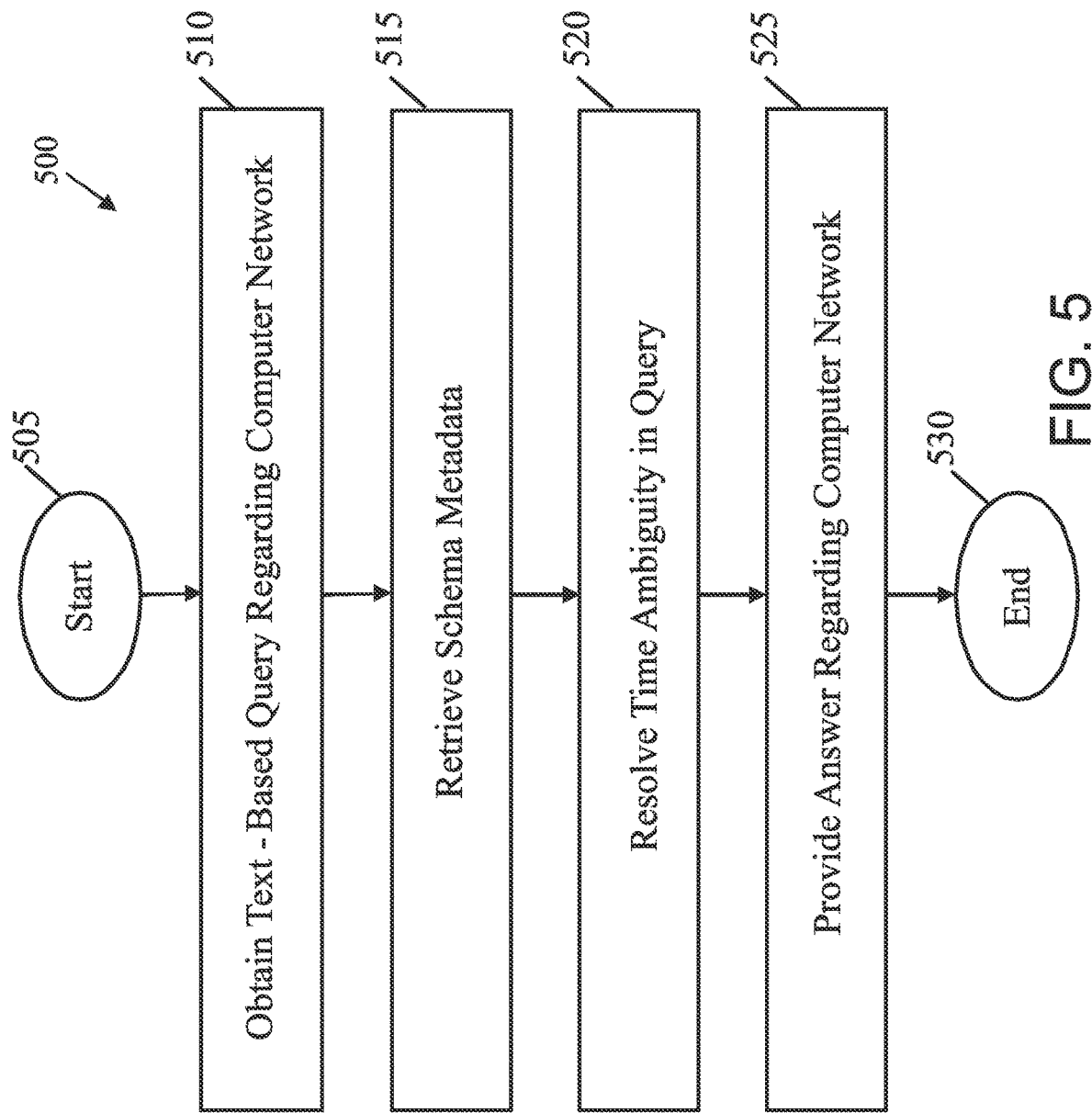
FIG. 5 illustrates an example simplified procedure for performing time disambiguation for natural language queries in network monitoring systems.

FIG. 5 illustrates an example simplified procedure 500 (e.g., a method) for performing time disambiguation for natural language queries in network monitoring systems, in accordance with one or more embodiments described herein. For example, a non-generic, specifically configured device (e.g., device 200) may perform procedure 500 by executing stored instructions (e.g., process 248), such as in conjunction with a network monitoring service. The procedure 500 may start at step 505, and continues to step 510, where, as described in greater detail above, the device may obtain a query from a user interface regarding a computer network. In some cases, the query asks a status of a particular networking device in the computer network.

At step 515, as detailed above, the device may retrieve, based on the query, schema metadata from a database. In various implementations, the schema metadata is for time series data in the database captured from the computer network. In some cases, the schema metadata is indicative of at least one of: a number of records per time unit for the time series data or a maximum time window for the time series data.

At step 520, the device may resolve any time ambiguity in the query using the schema metadata, as described in greater detail above. In various implementations, the device may do so by determining a desired time window associated with the query. In some implementations, the device uses a large language model (LLM) to resolve any time ambiguity in the query using the schema metadata. In further cases, the device may do so by sending, to the user interface, a request for a user to resolve any time ambiguity in the query, based on the schema metadata. In further instances, the device resolves any time ambiguity in the query based in part on contextual data associated with a user that issued the query via the user interface.

At step 525, as detailed above, the device may provide an answer to the query to the user interface, after resolving any time ambiguity in the query using the schema metadata. In some cases, the device may generate the answer to the query in part by translating the query into an application programming interface (API) call, after resolving any time ambiguity in the query using the schema metadata. In further cases, the device may generate the answer to the query in part by translating the query into a database lookup, after resolving any time ambiguity in the query using the schema metadata. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for time disambiguation for natural language queries in network monitoring systems, it is to be understood that various other adaptations and modifications may be made within the spirit and scope of the embodiments herein. For example, while certain embodiments are described herein with respect to using certain models for purposes of anomaly or change detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
obtaining, by a device, a query from a user interface regarding a computer network;
retrieving, by the device and based on the query, schema metadata from a database;
resolving, by the device, any time ambiguity in the query using the schema metadata; and
providing, by the device, an answer to the query to the user interface, after resolving any time ambiguity in the query using the schema metadata.

2. The method as in claim 1, wherein resolving any time ambiguity in the query comprises:
determining a desired time window associated with the query, wherein the query from the user interface does not specify any time window.

3. The method as in claim 1, wherein the device uses a large language model (LLM) to resolve any time ambiguity in the query using the schema metadata.

4. The method as in claim 1, wherein resolving any time ambiguity in the query using the schema metadata comprises:
sending, by the device and to the user interface, a request for a user to resolve any time ambiguity in the query, based on the schema metadata.

5. The method as in claim 1, wherein the schema metadata is for time series data in the database captured from the computer network.

6. The method as in claim 5, wherein the schema metadata is indicative of at least one of: a number of records per time unit for the time series data or a maximum time window for the time series data.

7. The method as in claim 1, wherein the query asks a status of a particular networking device in the computer network.

8. The method as in claim 1, wherein the device resolves any time ambiguity in the query based in part on contextual data associated with a user that issued the query via the user interface.

9. The method as in claim 1, further comprising:
generating, by the device, the answer to the query in part by translating the query into an application programming interface (API) call, after resolving any time ambiguity in the query using the schema metadata.

10. The method as in claim 1, further comprising:
generating, by the device, the answer to the query in part by translating the query into an SQL statement, after resolving any time ambiguity in the query using the schema metadata.

11. An apparatus, comprising:
one or more network interfaces;
a processor coupled to the one or more network interfaces and configured to execute one or more processes; and
a memory configured to store a process that is executable by the processor, the process when executed configured to:
obtain a query from a user interface regarding a computer network;
retrieve, based on the query, schema metadata from a database;
resolve any time ambiguity in the query using the schema metadata; and
provide an answer to the query to the user interface, after resolving any time ambiguity in the query using the schema metadata.

12. The apparatus as in claim 11, wherein the apparatus resolves any time ambiguity in the query by:
determining a desired time window associated with the query.

13. The apparatus as in claim 11, wherein the apparatus uses a large language model (LLM) to resolve any time ambiguity in the query using the schema metadata.

14. The apparatus as in claim 11, wherein the apparatus resolves any time ambiguity in the query by:
sending, to the user interface, a request for a user to resolve any time ambiguity in the query, based on the schema metadata.

15. The apparatus as in claim 11, wherein the schema metadata is for time series data in the database captured from the computer network.

16. The apparatus as in claim 15, wherein the schema metadata is indicative of at least one of: a number of records per time unit for the time series data or a maximum time window for the time series data.

17. The apparatus as in claim 11, wherein the query asks a status of a particular networking device in the computer network.

18. The apparatus as in claim 11, wherein the apparatus resolves any time ambiguity in the query using the schema metadata based in part on contextual data associated with a user that issued the query via the user interface.

19. The apparatus as in claim 11, wherein the process when executed is further configured to:
generate the answer to the query in part by translating the query into an application programming interface (API) call, after resolving any time ambiguity in the query using the schema metadata.

20. A tangible, non-transitory, computer-readable medium storing program instructions that cause a device to execute a process comprising:
obtaining, by the device, a query from a user interface regarding a computer network;
retrieving, by the device and based on the query, schema metadata from a database;
resolving, by the device, any time ambiguity in the query using the schema metadata; and
providing, by the device, an answer to the query to the user interface, after resolving any time ambiguity in the query using the schema metadata.

* * * * *